United States Patent [19]

Moyes

[11] Patent Number: 4,792,505
[45] Date of Patent: Dec. 20, 1988

[54] ELECTRODES MADE FROM MIXED SILVER-SILVER OXIDES

[75] Inventor: Hilary Moyes, Penn Hills Township, Allegheny County, Pa.

[73] Assignee: Westinghouse Electric Corp., Pittsburgh, Pa.

[21] Appl. No.: 133,588

[22] Filed: Dec. 14, 1987

[51] Int. Cl.$^4$ ............................................. H07M 4/34
[52] U.S. Cl. ................................................ 429/219
[58] Field of Search ..................................... 429/219

[56] References Cited

U.S. PATENT DOCUMENTS

| | | | |
|---|---|---|---|
| 2,833,847 | 5/1958 | Salauze | 136/29 |
| 3,294,590 | 12/1966 | Solomon | 136/120 |
| 3,332,801 | 7/1967 | Holechek et al. | 136/21 |
| 3,353,998 | 11/1967 | Langguth et al. | 136/6 |
| 3,655,450 | 4/1972 | Soto-Krebs | 136/107 |
| 3,749,604 | 7/1973 | Langer et al. | 136/20 |
| 3,953,241 | 4/1976 | Langer et al. | 136/145 |
| 4,078,125 | 3/1978 | Brown | 429/145 |
| 4,292,383 | 9/1981 | Di Palma et al. | 429/219 |
| 4,316,777 | 2/1982 | Dey | 429/218 X |
| 4,356,101 | 10/1982 | Jackovitz et al. | 252/182.1 |
| 4,383,015 | 5/1983 | Buzzelli | 429/206 |
| 4,481,266 | 11/1984 | Uttauer et al. | 429/80 X |
| 4,704,194 | 11/1987 | Seiger | 429/210 X |

FOREIGN PATENT DOCUMENTS 53-6840  1/1978  Japan.
53-68831 6/1978  Japan.

Primary Examiner—Brian E. Hearn
Assistant Examiner—Stephen J. Kalafut
Attorney, Agent, or Firm—Daniel P. Cillo

[57] ABSTRACT

An iron-silver battery is made, comprising a case 14 and a cover 15 conaining silver electrodes 10, iron electrodes 11, separators 13 between the electrodes, and electrolyte; where the siliver electrodes 10 are made by mixing a major amount by weight of large Ag particles and a minor amount by weight of small $Ag_2O$ particles, pressing the mixture to a current collector having at least a nickel surface, to provide an electrode, and sintering the electrode in a reducing gas to provide a body of sintered, all silver particles containing large particles and small sintered-pore particles, having a 50% to 70% porosity and a large surface area, and capable of discharging at from a C/8 rate up to a C/2 rate.

13 Claims, 2 Drawing Sheets

ELECTRODES MADE FROM MIXED SILVER-SILVER OXIDES

TECHNICAL FIELD

The present invention relates to electrodes made from particles of silver and silver oxide, containing a nickel or nickel-plated metal support-current collector, which may be used in silver-metal batteries, particularly silver-iron batteries.

BACKGROUND OF THE INVENTION

Silver-iron batteries are well known in the art, and are taught by Brown, in U.S. Pat. No. 4,078,125, and Buzzelli, in U.S. Pat. No. 4,383,015. These patents teach the use of perforated silver sheet or expanded silver screen supports containing active silver material for positive plates, multiply-microporous separators, and either sulfurized iron oxide and/or iron oxide hydrate negative plates according to the teachings of Jackovitz et al., U.S. Pat. No. 4,356,101, or sintered metallic iron negative plates.

The silver-iron battery is now generally considered more stable than the silver-zinc battery. The silver-zinc battery has always presented major problems of internal electrical shorts due to zinc dendritic growth from the negative plates through the separator system. Both battery systems are quite expensive, and are usually restricted to applications where the energy density of the battery is critical to the total system mission. An example of such an application is the propulsion system power source for underseas vehicles.

In the silver-iron battery, the silver electrode has been the primary life limiting component and the electrode that only performed well at a low discharge rate. The silver electrode art is quite extensive, and recent improvements over the old silver sheet plates have been made.

Salauze, in U.S. Pat. No. 2,833,847, taught mixing silver powder of less than 300 mesh, i.e. less than about 45 microns diameter, and nickel grains together, depositing them on both sides of a perforated or wire grid nickel or nickel plated steel support, and sintering the whole in a reducing atmosphere at about 800° C. This provided a reticulated nickel grain skeleton enclosing the silver grains. About 70 parts by weight of silver powder was used per 30 parts of nickel grains. This structure prevented silver agglomeration during electrochemical reaction, so that the plate remained porous to electrolyte and was able to retain its initial capacity when in service.

Solomon, in U.S. Pat. No. 3,294,590, recognized some disadvantages of silver electrodes charging at two voltage levels, the argentous oxide level and the argentic oxide level, and taught silver electrodes made from $Ag_2O$, argentous oxide, having a particle size below 2.5 microns diameter. Silver powder this small was capable of anodic oxidation to only the argentous level before onset of substantial oxygen evolution.

Holechek et al., in U.S. Pat. No. 3,332,801, taught embedding a metal grid, preferably silver or silver-coated malleable base metal, in a mass of finely divided monovalent and/or divalent silver oxide, which could also contain up to 25% of finely divided silver, all being preferably less than 325 mesh, i.e., about 45 microns. The found that use of a resilient grid, such as one made of nickel, deformed during high compression levels from 423 to 17,625 kg/cm$^2$ (3 to 25 tons/in$^2$), and when the loaded grid later returned to its original shape it could cause surface cracks or weak areas in the plate. They also found that use of over 50% silver powder caused the initial voltage to immediately decrease with continued high rate discharge.

Langguth et al., in U.S. Pat. No. 3,353,998, taught enclosing AgO and/or $Ag_2O$ particles in an electrically conductive, porous sheath of sintered nickel particles, where the sheath pores were filled with nickel hydroxide. The edges of the sheath were sealed to prevent silver migration. The resulting plate operated at two distinct potentials, and had a charge-discharge cycle life of over 1,000 cycles. This provided a rather complicated structure and process of manufacture, however. In fact, none of these silver electrodes is manufactured to be compatible with iron electrodes for a silver-iron battery system.

In other areas, Langer et al., in U.S. Pat. Nos. 3,749,604 and 3,953,241, relating primarily to battery separators, taught positive plates for a zinc battery, where the positive plates could be made by sintering a pasted oxide, silver powder or silver powder polymer to a silver grid. They could also be made by impregnating carbonyl plaques with silver compounds. In another area, relating to button cells, DiPalma et al., in U.S. Pat. No. 4,292,383, taught cathode material containing silver (I) oxide and a metal additive, selected from silver or nickel, which was effective to cause uniformly distributed silver upon discharge instead of forming layers. Both the silver and the nickel were added as powders having a particle size below 10 micron diameter. Additionally, a second additive selected from mercuric oxide, cadmium oxide, cadmium hydroxide or manganese dioxide could be added, to provide upon discharge, a stepped decrease in cell voltage, so that one could determine impending cell exhaustion. The voltage step could be observed visually, as when a display would dim, or it could be measured electronically. This, however, introduces a greater number of components into the cathode material and it may be difficult to provide a homogeneous mixture.

In other button cell publications, Krebs, in U.S. Pat. No. 3,655,450, teaches utilizing divalent silver oxide as the principal active material with a covering of a layer of monovalent silver oxide as a secondary active material. Muramatsu et al., in Japanese Patent Kokai No. 53-68831 (Application No. 51-144154, appears to teach an active material comprising major amounts of AgO of about 2 microns to about 5 microns average diameter, and a mixture of from about 2 wt.% to about 10 wt.% of silver powders, one having a particle size of from 0.01 micron to 0.1 micron, and the other, a particle size of from 5 microns to 10 microns. This use of small particle sizes is designed to eliminate the high voltage portion of the discharge curve and to reduce the internal cell resistance of the button cell. Kondo et al., in Japanese Patent Kokai No. 53-6840 (Application No. 51-82349), appears to teach mixing 100 parts by weight AgO with 2 parts by weight of fine silver powder having a particle size range of from 0.02 micron to 1 micron diameter, as a non-sintered anode in a button cell. A separate collector plate of Fe, Ni, Co, Ti, W and their alloys is placed next to the anode.

It is an object of the invention to provide a high discharge rate silver electrode, particularly adapted to the silver-iron couple, which electrode will have a long life and will not limit the performance of the silver-iron system.

SUMMARY OF THE INVENTION

With the above object in mind, the present invention resides, generally, in a positive silver electrode, having high internal surface area and a particle size distribution effective to maximize electrolyte penetration, supported on an active support structure having at least a surface material of nickel, i.e., made of all nickel or having a nickel coating. This electrode can be coupled with an iron electrode, preferably of sintered metallic iron, to provide a high energy capability, long-life, stable battery system, also containing a separator system between electrodes.

The silver electrode is made by: (1) mixing a major amount of dry elemental silver, having a particle size of from 47 microns diameter to 175 microns diameter, preferably from 55 microns to 175 microns diameter, with a minor amount of dry argentous oxide, i.e., silver (I) oxide or $Ag_2O$, having a particle size of from 3 microns diameter to 45 microns diameter, in the weight ratio of $Ag°:Ag_2O$ of about 1:0.05 to 0.40, (2) pressing the mixture into contact with at least one support structure having a nickel surface, and (3) sintering the consolidated structure, at from about 350° C. to about 550° C. in a reducing atmosphere, for from about 10 minutes to 90 minutes, so that the $Ag_2O$ particles are reduced to $Ag°$ particles, in the process losing oxygen from the lattice structure, gaining porosity, and bonding to the original silver particles.

This structure, which will retain its multi-sized silver particle distribution, coupled with a nickel support, provides a high discharge rate silver electrode of from about C/8 up to C/2, having high surface area, superior internal electrolyte access, and efficient current collection. The final electrode has a body of large and small sintered silver particles, that is from about 50% to 70% porous, excluding the conductive tab associated with the electrode, which is applied as a final step. The sintered silver particles are the sintered product of elemental silver particles of from 47 microns to 175 microns diameter and smaller $Ag_2O$ particles of from 3 microns to 45 microns diameter.

This electrode can be coupled with an appropriate iron electrode, separator system, electrolyte, housing, and electrical interconnects, to provide a stable, reliable, long-life, high energy density battery. On charging, the elemental silver in the positive plate will oxidize primarily to monovalent $Ag_2O$, the nickel of the support being effective to prevent complete oxidation to divalent AgO, and eliminating the usual upper voltage plateau on discharge. Thus, the silver electrode can be discharged at one voltage. Use of this electrode in any metal-Ag battery system has the advantage of this single discharge voltage.

BRIEF DESCRIPTION OF THE DRAWINGS

The objects and advantages of this invention will become more apparent by reading the following detailed description in conjunction with the drawings, which are shown by way of example only, wherein.

DESCRIPTION OF THE PREFERRED EMBODIMENTS

Figure 1:
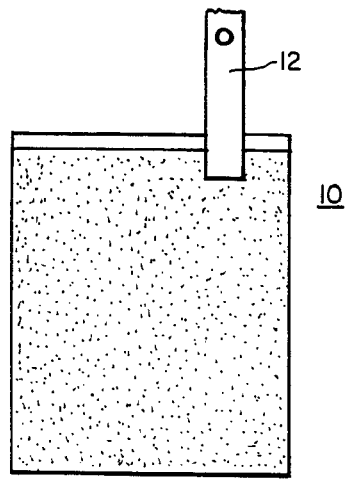
FIG. 1 shows one embodiment of the silver electrode of this invention.

Referring now to FIG. 1 of the Drawings, a positive silver electrode plate 10, is shown in accordance with this invention, also containing positive electrical lead tab 12. This silver electrode is made by: (1) mixing 1 part by weight of dry elemental silver particles, i.e., Ag° of about 99+% purity, preferably greater than 99.7% purity, having a particle size of from 47 microns diameter to 175 microns diameter, preferably from 55 microns to 175 microns diameter, with from about 0.05 to 0.40 part by weight, preferably 0.15 to 0.30 part by weight, of dry silver (I) oxide i.e., $Ag_2O$ or argentous oxide, particles having a particle size of from 3 microns diameter to 45 microns diameter, no other additives being necessary or desired; (2) pressing the mixture into contact with a support which is either nickel or nickel coated, by loading some of the mixture into a die cavity and pressing lightly to densify, followed by pressing the support into the modestly densified mixture, then adding additional mixture on top of the support, and finally, pressing to densify and consolidate the entire structure; (3) low temperature sintering the consolidated structure, at from about 350° C. to about 550° C. in a reducing atmosphere, preferably hydrogen gas, for from about 10 minutes to about 90 minutes, to form an electrode plate. During sintering, the $Ag_2O$ particles lose oxygen from their lattice structure, gaining porosity, and bonding to the original silver particles, to provide a sintered-pore structure having minute electrolyte permeable interstices throughout the silver matrix; and (4) applying a suitable electrical lead tab to the top of the electrode plate, preferably a silver or annealed nickel sheet.

The $Ag_2O$ particles are more stable in storage and less expensive than divalent silver oxide, i.e., AgO, and when reduced, provide a porous silver form. By using Ag° and $Ag_2O$ particles within the described particle size ranges and weight ratio, a silver electrode is formed after sintering that has an optimum amount of high surface area and superior internal electrolyte access. Within these parameters, the pores are not oversized at the expense of surface area, and are uniformly distributed. After sintering, the particles in the silver body attached to the support retain substantially their original shape, with a certain amount of deformation, and with interdiffusion of metal between particles to effect diffusion bonding.

The sintered silver particles are the sintered product of particles having the dual unsintered particle size ranges previously described. Low sintering temperatures must be used to prevent formation of agglomerated, non-porous silver masses. The sintered particles substantially retain their original size, so that even after sintering, the major portion is between 47 microns and 175 microns and the minor portion is between 3 microns and 45 microns. If over 0.40 part by weight of $Ag_2O$ is used per part Ag° or if the $Ag_2O$ particles are over 45 microns diameter, too much internal porosity of inadequate size pores will result. Under the specified ranges of both Ag° and $AgO_2$, too little porosity will result.

Under 47 microns for the Ag° particles and porosity may begin to suffer.

In this invention, where the silver plate performance is being matched to the iron plate performance, high internal surface area and good current collection together are not sufficient to provide high charge-discharge rates. Pore size and distribution for electrolyte penetration (providing reacting species and carrying away product species, in charge and discharge) must be optimized. Control of the internal electrode structure is achieved by the $Ag_2O$ addition, which is effective as a pore former upon sintering. High discharge rate electrodes, i.e., C/8 up to C/2, capacity (Ah)/Hours which result in Amperes, require that the pores between particles and within the particles are neither oversized nor undersized, i.e., do not carry excess electrolyte and reduce surface area of the electrode within a unit volume, nor prevent sufficient electrolyte approach to inaccessible high internal surface area, respectively, and that the pores are well distributed. All these requirements are met by the electrodes herein described, which can operate at a C/2 discharge rate.

Figure 2:
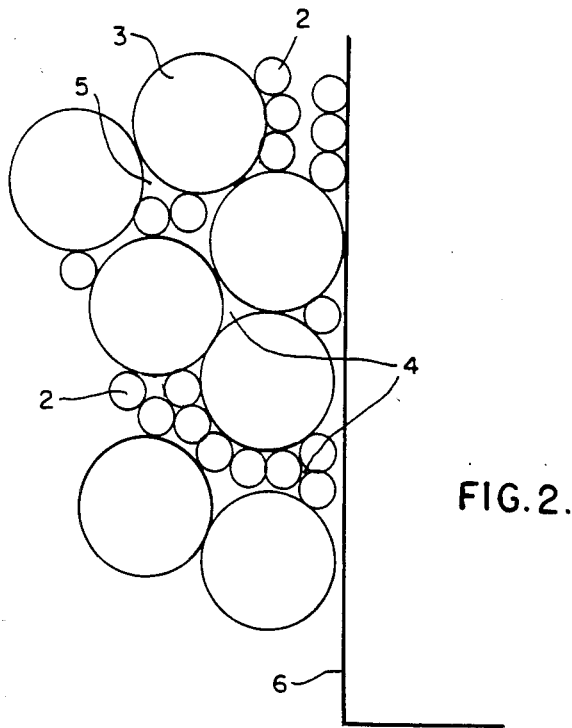
FIG. 2 shows a magnified cross-section of the electrode of FIG. 1, showing a possible idealized configuration of large and small particles.

FIG. 2 of the Drawings shows an idealized, magnified cross section of the silver electrode of FIG. 1 after sintering, where small silver particles 2 (initially $Ag_2O$) will tend to fill in gaps between the large silver particles 3 (initially and still Ag°), forming a matrix of smaller particles surrounding the larger particles. Even though a minor wt.% of small particles is used in this invention, this will generally result in a substantial number of small particles for each large particle. As can be seen, with a mixture of large and small particles, pores can be smaller and well distributed as at points 4, reducing the number of very large pores between large particles only as at point 5, if the small particles at point 5 were removed. The mixture of sintered particles from particle sizes within the % range of each size according to this invention, optimizes electrolyte flow versus internal surface area. We thus have a body with small particles disposed between large particles, to provide or effect a closely packed yet very porous mass.

The current collector is shown as 6. Initial pressing of the Ag° and $Ag_2O$ powders is from about 14.1 kg./cm.² (200 lb./in.²) to about 42.2 kg./cm.² (600 lb./in.²). Pressing of the support to the pressed portion of the Ag°—$Ag_2O$ powder is from about 42.3 kg./cm.² (600 lb./in.²) to about 56.2 kg./cm.² (800 lb./in.²). Preferred supports include flexible, expansible, nickel or nickel coated steel wool, about 0.01 cm. (0.004 inch) to 0.05 cm. (0.020 inch) thick, although nickel or nickel coated perforated sheet or mesh sheet can also be used. A final pressing, to consolidate the entire structure, after adding additional mixture, is from about 94.24 kg./cm.² (1280 lb./in.²) to about 451.2 kg./cm.² (6400 lb./in.²). The final pressure used depends on the thickness and density of the silver electrode required. The final electrode will be from about 50% to 70% porous (30% to 50% of theoretical density), excluding the conductive tab associated with the electrode.

The nickel component of the support has been found to interact during charge-discharge operation, and it is an essential feature of the electrode of this invention. During charging the Ag° particles, after all the $Ag_2O$ is formed, the nickel component of the support will cause an overvoltage situation to occur, where $O_2$ will be evolved rather than AgO being formed. The final silver electrode generally will be from about 0.1 cm (0.04 inch) to about 0.2 cm (0.08 inch) thick, having a single central or dual outside support-current collectors.

The final sintered electrode structure, now containing all Ag° particles, will contain a 50% to 70% porous mixture of silver particles containing about 5 wt.% to about 26 wt.% of small, porous silver particles, having minute pores in the lattice structure. These sintered silver particles result from or are the product of sintering $Ag_2O$ particles of from 3 microns to 45 microns diameter. The final structure will also have about 74 wt.% to about 95 wt.% of large sintered silver particles. These sintered silver particles result from or are the product of sintering elemental silver particles of from 37 microns to 175 microns diameter.

After sintering, the different sized particles can be distinguished, and will provide an optimized internal electrode structure of pore sizes and distribution directly related to the number and size of the initial particles. No other additives are necessary or desired, and no support other than one of nickel or having a nickel surface can be used. This dual particle size in the ranges set forth provides highly electrolyte permeable, uniformly distributed pores and interstices throughout the porous electrode structure, coupled with a stable high surface area of electrode material.

Figure 3:
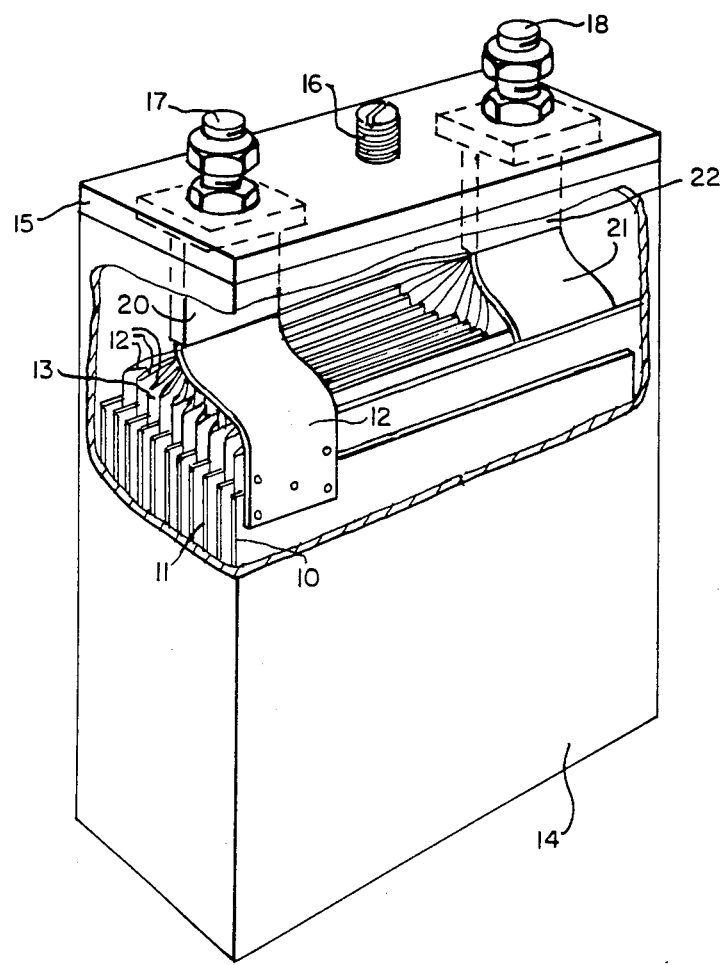
FIG. 3 shows a perspective view of one embodiment of the battery of this invention utilizing silver electrodes as positive plates.

FIG. 3 shows one embodiment of the metal Ag battery cell of this invention, with the plurality positive silver electrode plates 10, a plurality of negative plates, preferably Fe electrode plates 11, plate separators 13 between the positive and negative plates, all housed in case 14, having cover 15, optional vent 16, positive terminal 17, and negative terminal 18. Positive electrical lead tabs 12 are shown attached to intercell connection lug 20 and negative electrical lead tabs 21, disposed 180° away from the positive tabs, are shown attached to intercell connection lug 22. These lugs and tabs provide means for making electrical connections to the respective plates.

A suitable alkaline electrolyte, generally 25% to 45% aqueous KOH, with possible addition of minor amounts of alkali metal hydroxide, such as lithium hydroxide, would contact the electrode plates and separators within the case. The plate separators, which can be of a construction of porous and microporous plastic materials resistant to silver migration, or any other suitable combination of sheet materials, are generally shown at 13, not surrounding the plates for clarity of illustration. The plates preferably slide into the separators, which can be of an envelope type construction. This description of the separator system is not to be considered in any way limiting, and any suitable material or combination of materials effective to control silver migration yet allow free electrolyte circulation can be used.

The preferred iron electrodes 11, can be made from a fiber metal structure. This is a flexible, expansible, compacted sheet of relatively smooth, generally contacting, intermingled, metal fibers. Generally, the fibers when they are round have diameters between about 0.0005 to 0.0127 cm (0.0002 to 0.0050 inch). The plaque porosity is preferably between 75% and 95% porous, i.e. having a density between 5% and 25% of theoretical density. Further details on this type of structure, and suitable iron active materials that can be used therewith, can be found in U.S. Pat. No. 4,078,125, herein incorporated by reference. One of the preferred iron electrodes is made by calcining iron sulfate in an oxidizing atmosphere at a temperature in the range of from about 600° C. to about 850° C. for a time sufficient to produce an iron oxide with a trace amount of sulfate, and heating the sulfur containing iron oxide in a reducing atmosphere to produce activated elemental iron having a trace amount of sulfide (0.02 wt.% to 1 wt.%). This can then be applied to a suitable support-current collector. Further details on this material can be found in U.S. Pat. No. 4,356,101, herein incorporated by reference.

Another preferred iron electrode is made of sintered metallic iron, where the active, metallic, elemental iron itself constitutes the active electrode material. This structure can be made self-supporting, or can be used with at least one nickel, or nickel plated steel wool, mesh, or expanded metal sheet current collector. This electrode does not contain any sulfur or sulfur activators. The active battery material comprises substantially pure iron particles. This material can be produced from ferric oxide ($Fe_2O_3$). The $Fe_2O_3$ can be thermally reduced to metallic iron, $Fe°$, at between about 400° C. and about 1,000° C., in a reducing atmosphere, preferably $H_2$. It can then be ground or otherwise pulverized to a generally spherical particulate powder having an average particle size of between about 10 micron and about 275 micron diameter. The sized iron is pressed by a suitable pressing means, such as flat bed press, to provide a structure that can be handled. The structure, by itself or pressed to a supporting current collector, is then sintered to between about 700° C. and about 1,000° C., in a reducing atmosphere, preferably $H_2$. The particles sinter at their contact points to provide an interconnected, contacting, generally spherical agglomerate, sponge-like, metallic structure of iron. Further details on this material can be found in U.S. Pat. No. 4,383,015, herein incorporated by reference.

The following example further illustrative of this invention and is not to be considered in any way limiting.

EXAMPLE

Eight parts by weight of high purity (99+%) silver metal powder of from 50 micron to about 175 micron particle size was mixed with 2.16 parts by weight of monovalent silver (I) oxide ($Ag_2O$) powder, containing 2 parts by weight of silver or 20% silver added as $Ag_2O$, of from 5 micron to 44 micron particle size in a roller mill. A die cavity was loaded uniformly with one portion of the mixture which was lightly pressed at 18.2 kg./cm.$^2$ (400 lb./in.$^2$). Then, an 0.02 cm (0.008 inch) thick, expanded mesh, annealed nickel sheet, for use as a central current collector, was laid on top of the compressed $Ag°$—$Ag_2O$ mixture, and both were pressed together at about 56.4 kg./cm.$^2$ (800 lb./in.$^2$).

Another portion of the mixture was loaded on top of the current collector, the material leveled, and the whole consolidated at 135.4 kg./cm.$^2$ (1920 lb./cm.$^2$) to form an electrode. The pressed electrode was ejected from the die cavity and immediately sintered for 20 minutes in a furnace at 425° C. in a continuous flow of $H_2$ gas, with 20 minutes allowed for heat up, and 20 minutes allowed for cool down, to produce an all silver sintered structure. The density of the dual particle size, reduced, silver electrode after sintering was about 40% of theoretical density, i.e., about 60% porous, about 4.2 g./cm.$^3$. The electrode had a surface area of 20 cm.$^2$ (2.12 in.$^2$). An annealed nickel tab was then welded to the center of the electrode. This positive silver electrode was then cycled in electrolyte containing 40% aqueous KOH, versus a sintered iron negative electrode of similar area, with a suitable separator system between the two dissimilar electrodes. The results shown in Table 1 below:

| | |
|---|---|
| Active Silver Electrode Wt (g) | 6.27 |
| Structural Component Wt (g) | 0.46 |
| Electrode Thickness (cm(in)) | 0.152 (0.060) |
| Silver added as Silver Oxide (%) | 20.0 |
| Final Pressing kg/cm$^2$ (lb/in$^2$) | 135.4 (1920) |
| Active Silver Electrode Density (% $TD_{Ag}$) | 40.0 |
| Active Iron Electrode Density (% $TD_{Fe}$) | 22.6 |
| Average Capacity on Discharge (Ahr/g) | 0.36 |
| Average Voltage During Discharge | 1.10 |
| Discharge Rate (A/cm$^2$) | 0.016 |
| Charge Rate (A/cm$^2$) | 0.020 |
| Average Charge Acceptance (%) | 85 |
| Design Capacity (Ahr) | 2.26 |
| Rate | C/7 |

Figure 4:
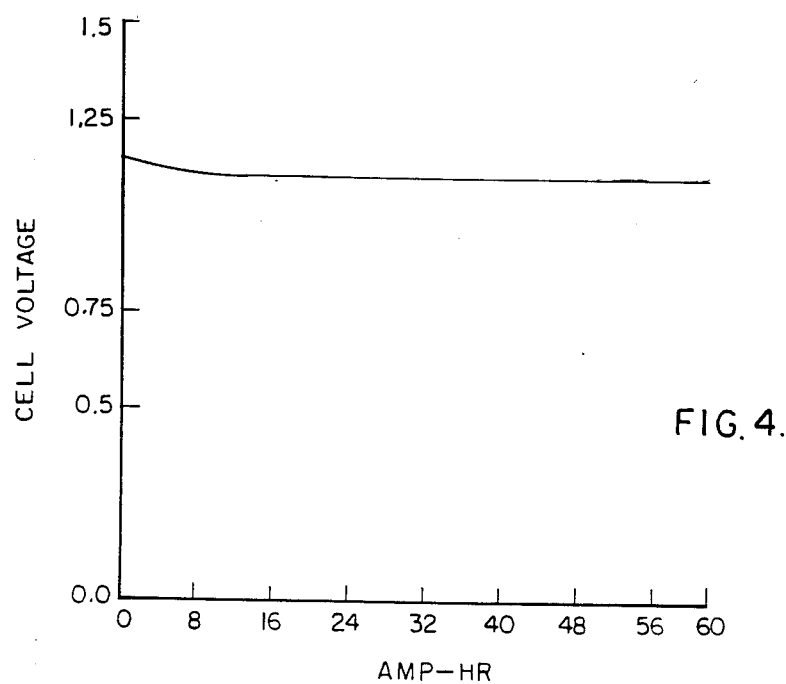
FIG. 4 shows a flat voltage versus amp-hour discharge curve for a typical silver electrode made according to this invention.

As can be seen from Table 1, charge and discharge rates are excellent as is average charge acceptance. Performance is stable upon repeated cycling, with a constant discharge voltage characteristic of 1.10 V at the given drain rate. Higher drain rates result in only a small decrease in system voltage due to very low polarization losses in the conductive silver and iron electrodes. The system is limited only by the life of the separator, with the electrodes (both the silver and the iron) being dimensionally stable and long-lived. This silver electrode will also run at a C/2 rate in which case the capacity on discharge drops from 0.36 Ahr/g to about 0.32 Ahr/g. A cell voltage versus amp-hr. curve of another·silver electrode of this type is shown in FIG. 4 of the Drawings. The curve has a single voltage level at a discharge rate of 10 mA/cm$^2$ for a silver plate having a design capacity of 60 Ahr.

I claim:

1. An iron-silver battery, comprising a case and a cover, within which are disposed at least one silver electrode, at least one iron electrode, at least one separator between the electrodes where the separator is made of a material resistant to chemical attack by alkaline electrolyte, and means for making electrical connections to the respective electrodes, the improvement characterized in that the silver electrode consists essentially of a sintered silver particle body that is 50% to 70% porous, supported by at least one current collector having at least a surface material of nickel, where a major portion by weight of the sintered silver particle body are particles produced by sintering elemental silver particles having a size of from 47 microns to 175 microns diameter and a minor portion by weight of the sintered silver particle body are particles produced by sintering $Ag_2O$ particles having a small size of from 3 microns to 45 microns diameter, to provide a sintered body with small particles disposed between large particles, effecting a closely packed yet porous mass, where the sintered particles substantially retain their original size, and the nickel in the current collector is effective to allow silver in the silver electrode to oxidize primarily to $Ag_2O$ rather than to AgO, upon charging the silver electrode.

2. The iron-silver battery of claim 1, where the active material of the negative electrode plates comprises iron particles, the separator comprises plastic material, the current collector is nickel, and the major portion of the sintered silver particle body are particles produced by sintering elemental silver particles having a size of from 55 microns to 175 microns.

3. The iron-silver battery of claim 1, where the active material of the negative electrode plates comprises a sintered metallic structure of iron.

4. The iron-silver battery of claim 1, where the major portion of sintered silver particles comprise from 74 wt.% to 95 wt.% of the total sintered silver particles and the minor portion of sintered silver particles comprise from 5 wt.% to 26 wt.% of the total sintered silver particles, and where the silver electrode has a discharge rate of C/8 or greater.

5. A silver electrode consisting essentially of a sintered silver particle body that is 50% to 70% porous, supported by at least one current collector having at least a surface material of nickel, where a major portion by weight of the sintered silver particle body are particles produced by sintering elemental silver particles having a size of from 47 microns to 175 microns diameter and a minor portion by weight of the sintered silver particle body are particles produced by sintering $Ag_2O$ particles having a small size of from 3 microns to 45 microns diameter, to provide a sintered body with small particles disposed between large particles, effecting a closely packed, yet porous mass, where the sintered particles substantially retain their original size, and the nickel in the current collector is effective to allow silver in the silver electrode to oxidize primarily to $Ag_2O$ rather than to AgO, upon charging the silver electrode.

6. The silver electrode of claim 5, where the current collector is nickel, and the major portion of sintered silver particle body are particles produced by sintering elemental silver particles having a size of from 55 microns to 175 microns.

7. The silver electrode of claim 5, where the major portion of sintered silver particles comprise from 74 wt.% to 95 wt.% of the total sintered silver particles and the minor portion of sintered silver particles comprise from 5 wt.% to 26 wt.% of the total sintered silver particles, and where the silver electrode is capable of a discharge rate of C/8 or greater.

8. The iron-silver battery of claim 1, where the silver electrode is a sintered-pore structure having minute electrolyte permeable interstices throughout the silver matrix, and the pores in the silver electrode are uniformly distributed.

9. The iron-silver battery of claim 1, where the small size silver particles form a matrix surrounding the larger silver particles, and the silver particles are bonded together by an interdiffusion of metal between particles.

10. The iron-silver battery of claim 1, where the nickel in the current collector causes, upon charging the silver electrode, an overvoltage after all the $Ag_2O$ is formed, resulting in $O_2$ evolution rather than AgO formation, so that the silver electrode can be discharged at a single voltage level.

11. The silver electrode of claim 5, where the silver electrode is a sintered-pore structure having minute electrolyte permeable interstices throughout the silver matrix, the pores in the silver electrode are uniformly distributed.

12. The silver electrode of claim 5 where the small size silver particles form a matrix surrounding the larger silver particles, and the silver particles are bonded together by an interdiffusion of metal between particles.

13. The silver electrode of claim 5, where the nickel in the current collector causes, upon charging the silver electrode, an overvoltage after all the $Ag_2O$ is formed, resulting in $O_2$ evolution rather than AgO formation, so that the silver electrode can be discharged at a single voltage level.

* * * * *